UNITED STATES PATENT OFFICE.

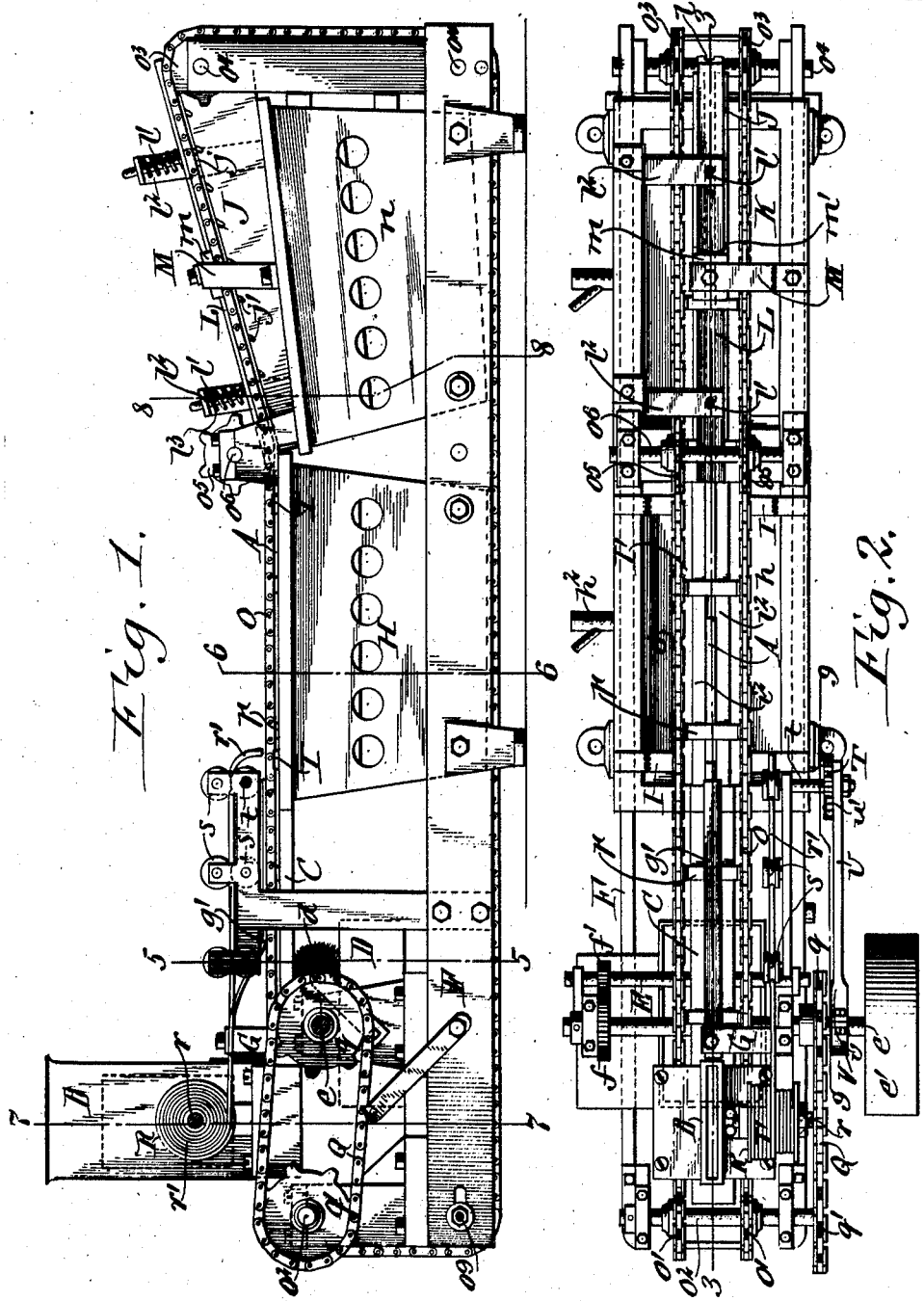

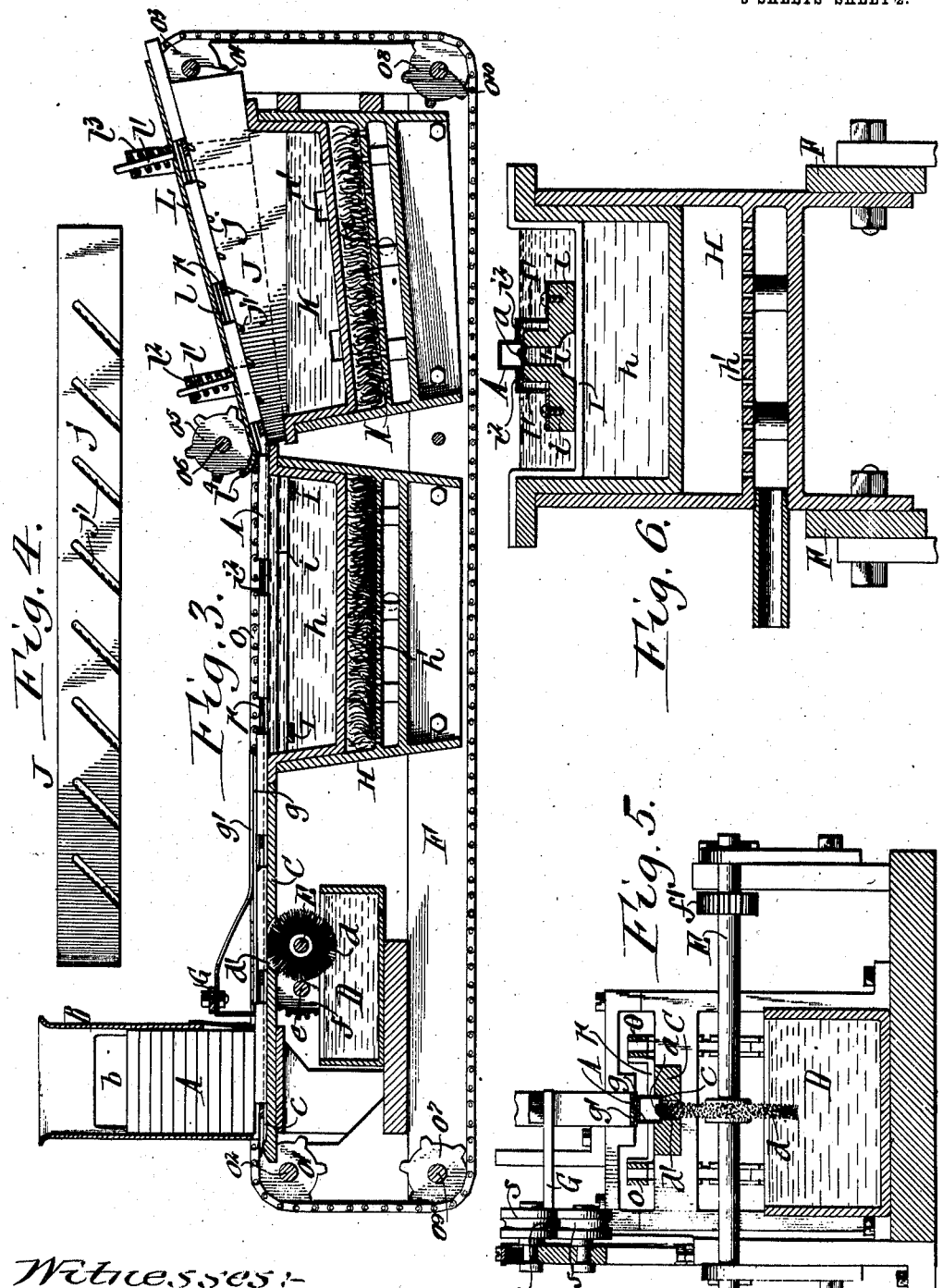

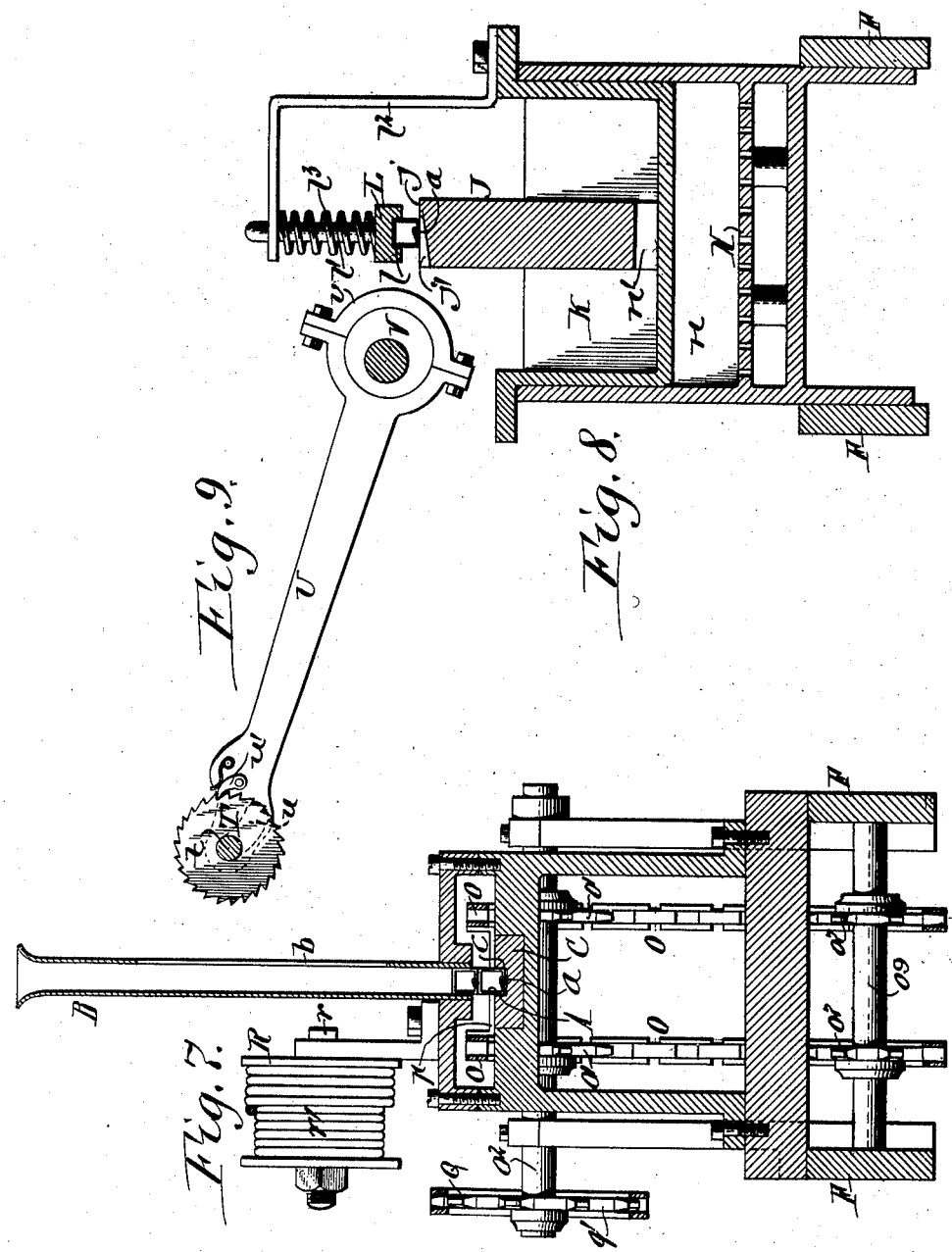

JOHN M. FEDDERS, OF BUFFALO, NEW YORK, ASSIGNOR TO THEODORE C. FEDDERS, OF BUFFALO, NEW YORK.

TUBE-SOLDERING MACHINE.

985,151. Specification of Letters Patent. Patented Feb. 28, 1911.

Application filed October 29, 1910. Serial No. 589,687.

*To all whom it may concern:*

Be it known that I, JOHN M. FEDDERS, a citizen of the United States, residing at Buffalo, in the county of Erie and State of New York, have invented new and useful Improvements in Tube-Soldering Machines, of which the following is a specification.

This invention relates to a machine which is more particularly designed for soldering the longitudinal seams of square tubes which are used in constructing radiators for cooling the water which is circulated around the cylinders and other parts of automobile engines. Heretofore this operation has been performed by hand and since radiators of this character require a very large number of such tubes in their construction and this soldering has to be perfect so as to effectually seal the seam or joint in the tubes this soldering operation formed a very considerable part of the expense in the production of radiators of this character.

It is the object of this invention to provide a machine whereby the longitudinal seams of automobile radiator tubes may be soldered or sealed perfectly, expeditiously and at comparatively low cost.

In the accompanying drawings consisting of 3 sheets: Figure 1 is a side elevation of a tube soldering machine embodying my invention, the main driving shaft, the solder spool shaft and the solder feeding shaft being shown in section for greater clearness. Fig. 2 is a top plan view of the machine. Fig. 3 is a vertical longitudinal section of the machine taken in line 3—3, Fig. 2. Fig. 4 is a detached top plan view of the stripper or stripping plate whereby the surplus solder is removed from the tubes. Figs. 5, 6, 7 and 8 are vertical transverse sections, on an enlarged scale, in the correspondingly numbered lines in Fig. 1. Fig. 9 is a fragmentary vertical longitudinal section, on an enlarged scale, in line 9—9, Fig. 2.

Similar letters of reference indicate corresponding parts throughout the several views.

In its general organization this tube soldering machine comprises means for supplying the tubes to be soldered, means for applying a flux to the longitudinal seam or joint of the tubes, means for applying solder to the joint of the tubes after the same have been fluxed and means for removing the surplus solder from the joint of the tubes after the solder has been applied thereto. This machine may be organized for soldering the seams of tubes which are variously constructed and which may be used for various purposes, the machine, however, which is shown in the drawings is designed to solder the longitudinal joints or seams $a$ of automobile radiator tubes A which are square, or substantially so in cross section. These tubes are piled or stacked vertically in a supply magazine or box B, into which they may be introduced either through the open top thereof or through an opening $b$ at the side thereof. At the lower end of the magazine the tubes are carried or fed off horizontally and lengthwise one at a time and as each lowermost tube is carried away the remainder of the pile drops by gravity, so that the following tube of the pile is in its lowermost position and ready to be carried away by the carrying mechanism. Each tube as it reaches the lowermost position in the stack is arranged with its lower side in a horizontal longitudinal groove $c$ of a guide bar or supply track C which is arranged below the magazine and extends forwardly beyond the front side of the same. As each tube is fed forwardly from underneath the pile the same moves in the groove of the guide track C with its longitudinal seam on its underside. As each tube passes forwardly on the supply track from underneath the magazine a flux, preferably in liquid form, is applied to the longitudinal seam of the tube. This flux is contained in a tank or reservoir D arranged below the supply track and is deposited on the longitudinal seam of the tube as the same moves forwardly by means of a rotary brush $d$ which dips with its lower part into the flux while its upper part projects through an opening $d^1$ in the bottom of the groove of the supply track and wipes the same along the entire length of the seam of the tubes during the forward movement of the latter. The fluxing brush is mounted on a transverse shaft E journaled in suitable bearings on the main frame F and driven from the adjacent driving shaft $e$ of the machine by means of intermeshing gear wheels $f$, $f^1$ mounted respectively on these shafts, as shown in Fig. 2. The driving shaft $e$ is journaled in suitable bearings on the main frame and power may be transmitted to the same in any suitable manner but preferably by passing a driving belt around a pulley $e^1$ on the driving shaft. The tubes are held down in the groove of the supply track, so that they are not displaced by the rotary action of the fluxing brush engaging with the undersides of the same. This holding down device is preferably of a yielding character so that it adapts itself to any slight inaccuracies or variations in the tubes and still holds the same reliably against displacement. For this purpose the holding-down device preferably comprises a lower leaf spring $g$ having a horizontal part which is arranged lengthwise over the path of the tubes in front of the magazine and is adapted to engage with the upper sides of the tubes, an upper reinforcing spring $g^1$ bearing at its free front end downwardly against the free front end of the lower spring $g$, and a bracket G secured to the adjacent part of the frame or other suitable fixed part of the machine and supporting the rear fixed ends of the lower and upper holding down springs. As each tube is carried forward from the magazine it passes underneath the lower spring of the holding-down device and deflects the same upward slightly, whereby the tube is held in place and proper fluxing of the same is insured as the same is carried forwardly over the supply track.

After the tube has been fluxed a coating of solder is applied to the longitudinal seam or joint of the same by a solder applying device which is preferably constructed as follows: H represents a heating chamber arranged in front of the flux reservoir or tank. In the upper part of the heating chamber is arranged a solder supplying pot $h$ which is adapted to hold a supply of molten solder which is kept constantly in a melted condition and at the desired temperature by a flame which plays against the underside of the solder pot. This flame is supplied by a burner which may be of any suitable construction. As shown in the drawings, however, this burner is constructed by dividing off the lowermost part of the heating chamber by means of a horizontal perforated partition $h^1$ so as to form a fuel distributing chamber into which the gas or other fuel is delivered by means of a pipe $h^2$ at the side thereof and from which the fuel escapes upwardly to the openings in the partition and burns in the form of a flame which engages with the underside of the solder supplying pot.

Extending over the upper part of the solder supplying pot is a horizontal longitudinal track which guides the tubes from the supply track across the top of the solder in the pot, so that a thin film or coating of solder is applied to the longitudinal seam of the tube. For the purpose the level of the solder in the pot is maintained at such a height that as the tube is carried horizontally and lengthwise over the path of solder only the lower side of the tube containing the seam is drawn over or brought in contact with the molten solder. The track of the solder applying device preferably comprises two longitudinal horizontal parallel rails $i, i$ which are separated from each other by an intervening space $i^1$ and which have guide faces on their upper side forming continuations of the bottom of the groove $c$ of the supply track on opposite sides of the longitudinal center thereof. These lower guide rails may be supported within the upper part of the solder supplying pot by means of two hangers I suspended from the adjacent edges of the solder applying pot, as shown in Figs. 2, 3 and 6, or by any other suitable means. The track of the solder applying device also comprises two upper horizontal longitudinal tracks $i^2, i^2$ which have their inner opposing faces arranged above the faces of the lower tracks and form continuations of the opposite side walls of the guide groove $c$ of the tube supplying track.

The upper guide rails of the solder applying track may be supported in any suitable manner but preferably by the means which are shown in the drawings and which comprise brackets $I^1$ each of which is secured at its upper end to one of the upper guide rails while its lower part is secured to the adjacent lower part of the companion lower guide rail, as shown in Figs. 2 and 6.

As each tube is carried lengthwise forward over the track of the solder applying device the underside of each tube rests adjacent to its lower corners on the upper faces of the lower tracks $i$ while the central seamed part of the tube is arranged vertically in line with the space $i^1$ between the two lower tracks, and the two upper rails engage with the opposite vertical sides of the tube at a distance from the lower side thereof. The level of the solder is maintained at such a height in the solder applying pot that the same is on a line with or slightly above the upper faces of the lower guide rails $i, i$, whereby the solder between the two lower guide rails is brought into engagement with the longitudinal seam on the underside of the tube and a thin film of the same is deposited on this seam as the tube is moved over the surface of the same. By arranging the upper guide rails of the solder applying device above the faces of the lower rails it is possible to bring the lower seamed side of the tube thoroughly and effectively in contact with the molten solder so as to obtain a sufficient deposit of solder on the seam for properly sealing the joint while at the same time providing for a free movement of the tube through the solder and without the liability of trapping any of the solder in such a position as would cause the same to clog the path of the tube and obstruct or interfere with its free forward movement over the solder applying pot.

After the solder has been deposited upon the seam of a tube the latter is presented to a stripping device which operates to strip or remove the surplus solder from the tubes, thereby not only avoiding waste but also making the radiator in which the tube is installed very much lighter and also increasing the radiating capacity of the same by avoiding undue thickening of the metal of the tubes which would be the case if an unnecessary amount of solder were deposited on the same.

The preferred means for thus stripping or removing the surplus solder from the radiator tubes is constructed as follows: J represents a stripping bar or plate having a stripping face $j$ on its upper side which inclines upwardly from its rear receiving end to its front delivery end. The receiving end of this stripping plate is arranged immediately in front of the solder applying pot and forms a continuation of the guide surfaces of the lower rails $i$, $i$ in said pot. The upper side or face of the stripping plate is provided with a plurality of transverse stripping grooves $j^1$ which are preferably arranged at a downwardly inclined angle and open at their lower ends at the adjacent vertical side of the stripping plate while their upper ends stop short of the opposite side of the stripping plate and are therefore closed at these ends thereof. After each radiator tube has been moved over the solder-applying device and a coat or film of solder has been deposited on the longitudinal seam of its under side, this tube is moved lengthwise forward with its solder coated underside over the inclined face of the stripping plate and during this movement the several shoulders formed by the front edges of the stripping grooves in this plate operate successively on the underside of the tube and scrape or wipe off the surplus solder on the tube. Any solder which is removed by this stripping plate is conducted laterally by the downwardly inclined grooves $j^1$ into a catch basin K which is arranged below the stripping plate.

As the tubes move lengthwise and upward along the face of the stripping plate the same are guided and held against lateral displacement thereon by means of a guiding device which preferably comprises an upper inclined guide bar L arranged lengthwise above the face of the stripping plate and provided in its under side with a longitudinal groove $l$ adapted to receive the upper part of the tubes, two guide rods $l^1$ projecting upwardly from the guide bar near opposing ends thereof, two brackets $l^2$ rising from the catch basin and provided at their upper ends with openings which receive the upper ends of the guide rods, and springs $l^3$ surrounding the guide rods between the guide bar and brackets and operating to hold the guide bar yieldingly in a depressed position so that the same presses the tubes yieldingly against the stripping plate and insures thorough removal of the surplus solder from the tubes as the latter are carried over the stripping plate. To facilitate the entrance of the tubes underneath the receiving end of the guide bar this end is rounded or turned upwardly, as shown at $l^4$ in Fig. 3. The guide bar is further held against lateral displacement while the tubes are moving in contact with the same by means of a stationary bracket M secured to the adjacent part of the catch basin and a guide block $m$ secured to the upper inner end of the bracket and provided on its underside with a guide groove $m^1$ which receives the upper part of the guide bar and in which the latter can rise and fall to adapt itself to the tubes but is held against lateral movement therein.

The stripping plate is preferably arranged lengthwise in the central part of the catch basin and practically divides the same into two parts both of which contain molten metal so as to keep the stripping plate hot and enable the same to effectually remove the surplus solder from the tubes. The solder which is utilized in the catch basin for thus maintaining the stripping plate at a high temperature is preferably derived from the surplus which is stripped from the tubes and discharged by the stripping plate into the catch basin. This surplus solder is kept hot by a burner N which is arranged in the lower part of a heating chamber $n$ supporting the catch basin and which is constructed substantially like the burner which melts the solder in the applying pot. In order to cause the solder to rise to the same level in the catch basin on opposite sides of the stripping plate the lower part of this plate is provided with one or more openings $n^1$ to permit the solder to flow from one compartment of the catch basin to the other.

Various means may be provided for moving the tubes successively from the supply magazine over the supply track, past the fluxing device, over the track of the solder applying device and over the working face of the stripping plate and then discharging the finished tubes successively from the front end of the stripping plate. The means which are shown in the drawings are suitable and are constructed as follows: O, O represent two endless belts preferably of the chain type which are arranged side by side and pass with their operative upper portions along opposite sides of the supply magazine, fluxing device, solder applying device, stripping device and the track associated therewith while the lower idle parts of these chains are arranged below the working parts just mentioned. The receiving ends or parts of these chain belts pass around a pair of sprocket wheels $o^1$, $o^1$ which are arranged at the rear end of the supply track and mounted upon a rear shaft $o^2$, the delivery parts of the same pass around a pair of delivery sprocket wheels $o^3$, $o^3$ which are arranged adjacent to the front elevated end of the stripping plate and mounted on a front shaft $o^4$, the intermediate parts thereof pass around a pair of intermediate sprocket wheels $o^5$, $o^5$ arranged between the solder supply pot and the solder catch basin and are supported on a transverse shaft $o^6$ in such a position that the upper parts of these chain belts are horizontal between the supply wheels and the intermediate wheels and inclined parallel with the face of the stripping plate between the intermediate wheels $o^5$ and the delivery wheels $o^3$, and the lower parts of the chain belts pass around sprocket wheels $o^7$, $o^7$, $o^8$, $o^8$ mounted on shafts $o^9$, $o^{10}$ arranged in the lower part of the machine and supporting the lower parts of the chain belts. At intervals the two belts are connected by transverse feeding wings or cross bars $p$ which move successively through the spaces between the magazine and the rear part of the supply track, the fluxing wheel and the tube retaining device above the same, thence over the track of the solder applying device, and thence through the space between the face of the stripping plate and the guide bar immediately above the same, whereby these wings engage successsively with the rear ends of the tubes at the magazine, then present the same successively to the fluxing, solder applying and solder stripping devices and then discharge the same from the machine. The endless carrier or propeller whereby the tubes are thus moved through the machine is preferably operated by means of a chain belt Q passing around sprocket wheels $q$, $q^1$ on the shaft of the receiving sprocket wheels $o^1$, $o^1$ and on the driving shaft, as shown in Figs. 1 and 2.

Inasmuch as the tubes upon being fed over the bath of molten solder in the pot of the solder applying device cause a consumption or diminution of the solder the supply of solder in this pot must be renewed to keep pace with the operation of soldering the tubes. This replenishing of the solder in the solder applying pot may be effected by transferring some of the solder from the catch basin to the solder applying pot in such quantities as are necessary to keep the level in the latter at the proper height to effectually solder the tubes. It is preferable, however, to effect this replenishing of metal in the pot of the solder applying device automatically in the same measure as the solder in the same is carried away by the tubes. Various means may be provided for this purpose but that shown in the drawings is constructed at follows: R represents a spool or reel mounted on a stationary arbor $r$ on the frame and carrying a coil of solder wire $r^1$ of the quality employed for soldering the tube. This wire is unwound from the spool and passes forwardly between a plurality of pairs of guide rollers $s$, $s$ the foremost pair of which is arranged adjacent to the rear end of the solder supplying pot, so that the end of the solder wire projecting forwardly beyond the foremost pair of guide rollers becomes soft by the heat of the molten solder underneath the same and permits this end to be bent downwardly by its weight and hang into the molten solder in the pot. During the operation of the machine the solder wire is automatically fed forward and as its front end enters the supply pot the same is melted off and in this way the metal in the pot is replenished at the same rate at which the soldering operation progresses. This automatic feeding of the solder wire is preferably effected by turning one of the rollers $s$ of the foremost pair, preferably the lower one of this pair, as shown in the drawings. The turning of this roller is effected by means comprising a shaft $t$ provided with a ratchet wheel T, a shifting rod U provided at one end with a curved slot $u$ which receives the shaft $t$ of the lower front guide roller $s$, a spring pressed pawl or dog $u^1$ mounted on the same end of the shifting rod and engaging with the teeth of the ratchet wheel, and an eccentric V mounted on the driving shaft and engaging with a strap $v$ on the opposite end of the shifting rod U. During each rotation of the eccentric the shifting rod is moved lengthwise and also circumferentially relatively to the ratchet wheel whereby the pawl or dog $u^1$ is caused to oscillate with reference to the ratchet wheel and move the same forward step by step thereby causing the lower guide roller of the foremost pair to feed the solder wire forward and compensate for the solder which sticks to the tubes.

I claim as my invention:

1. A tube soldering machine comprising means for applying solder to the tubes, and means for removing the surplus solder from the tubes comprising a plate having oblique grooves in its face over which the outer solder coated surface of each tube is moved.

2. A tube soldering machine comprising means for applying solder to the tubes, and means for removing the surplus solder from the tubes comprising a grooved stripping plate past which the outer solder coated surface of each tube is moved and means for holding the tubes against said stripping plate comprising a presser plate adapted to engage with the tube opposite to the solder coated side thereof, and springs for holding said presser plate yieldingly in engagement with the tube.

3. A tube soldering machine comprising means for applying solder to the tubes, and means for removing the surplus solder from the tubes comprising an inclined plate which is provided on its face with transverse grooves and over which the tubes are moved with their outer solder coated surfaces.

4. A tube soldering machine comprising means for applying solder to tubes and means for removing the surplus solder from the tubes comprising a stripping surface over which the tube is moved with its solder coated side, and means for pressing the tubes against said surface comprising a pressing bar provided with a groove which receives the tubes, means for guiding said bar in its movement relatively to the tubes, and springs operating to press said bar against the tubes.

Witness my hand this 27th day of October, 1910.

JOHN M. FEDDERS.

Witnesses:
 THEO. L. POPP,
 ANNA HEIGIS.